UNITED STATES PATENT OFFICE.

HERMANN BOEDEKER, OF HÖCHST, GERMANY, ASSIGNOR TO THE FARB-WERKE, VORMALS MEISTER, LUCIUS & BRÜNING, OF SAME PLACE.

PINK DYE.

SPECIFICATION forming part of Letters Patent No. 493,241, dated March 14, 1893.

Application filed August 3, 1891. Renewed December 29, 1892. Serial No. 456,705. (Specimens.)

*To all whom it may concern:*

Be it known that I, HERMANN BOEDEKER, doctor of philosophy, a subject of the Emperor of Germany, residing at Höchst-on-the-Main, in the Empire of Germany, have invented certain new and useful Improvements in the Production of Coloring-Matter; and I do hereby declare the following to be a full, clear, and exact description of the invention, such as will enable others skilled in the art to which it appertains to make and use the same.

This invention relates to the production of coloring matter from fluoresceïne chloride and mesidine.

Example: Thirty-seven parts by weight of fluoresceïne-chloride, thirty parts by weight of mesidine, and sixteen parts by weight of zinc-chloride are heated to from 200° to 210° centigrade for two hours. The melt with metallic luster thus produced is ground and, in order to free it from the base that has not entered into reaction and from the zinc-chloride, boiled with diluted hydrochloric acid, then pressed off and dried. The coloring matter thus obtained, is in the form of a light-red powder, insoluble in water but easily soluble in alcohol giving vivid red color; it has the formula $C_{38}H_{34}O_3N_2$. In order to convert it into the sulphonic acid, one part of the coloring matter, soluble in spirit, at a temperature of from 20° to 25° centigrade, is introduced into from six to eight parts of fuming sulphuric acid of five per cent. anhydride and kept agitated until a sample, on being dissolved in a soda-solution, no longer leaves any residue. Now the sulphonic acid is precipitated, by pouring in water, washed, dissolved in soda-solution and the sodium salt thus formed precipitated from the filtered solution by the addition of common salt; it is now pressed off and dried. It has the formula $C_{38}H_{33}O_3N_2So_3Na$. It is in the form of a light red powder which is easily soluble in cold and hot water, with difficulty soluble in alcohol and gives a vivid red color. It dyes wool and silk vivid pink shades and excels in its resistance to light, fulling and soap. It is precipitated from its aqueous solution in the form of red flakes by mineral acids but only partly so by acetic acid.

The coloring matter is soluble in acetic acid not too much diluted. In concentrated sulphuric acid it dissolves with red color, the solution being rendered more bluish by the careful addition of water, more water precipitating the coloring matter acid. In concentrated nitric acid it dissolves with yellow-red coloration but not so in concentrated hydrochloric acid.

I claim—

As a new article of manufacture, coloring matter, the alkali salt of a sulphonic acid, derived from fluorescein chloride and mesidine and having the formula $C_{38}H_{33}O_3N_2So_2$ alk', a light red powder, easily soluble in hot and cold water, difficultly soluble in alcohol, giving vivid red color, mineral acids precipitating from its aqueous solution, the sulphonic acid in the form of red flakes, as set forth.

In testimony whereof I affix my signature in presence of two witnesses.

HERMANN BOEDEKER.

Witnesses:
  JOSEF REVEDY,
  HEINRICH HAHN.